(12) United States Patent
Gudov et al.

(10) Patent No.: US 10,693,907 B2
(45) Date of Patent: Jun. 23, 2020

(54) SYSTEM AND METHOD OF TRAFFIC FILTERING UPON DETECTION OF A DDOS ATTACK

(71) Applicant: AO Kaspersky Lab, Moscow (RU)

(72) Inventors: Nikolay V. Gudov, Moscow (RU); Alexander A. Khalimonenko, Moscow (RU); Denis E. Koreshkov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 234 days.

(21) Appl. No.: 15/614,713

(22) Filed: Jun. 6, 2017

(65) Prior Publication Data

US 2018/0316714 A1 Nov. 1, 2018

(30) Foreign Application Priority Data

Apr. 28, 2017 (RU) ................................ 2017115047

(51) Int. Cl.
*H04L 29/06* (2006.01)

(52) U.S. Cl.
CPC ...... *H04L 63/1458* (2013.01); *H04L 63/1425* (2013.01)

(58) Field of Classification Search
CPC ......... H04L 63/00; H04L 63/10; H04L 63/14; H04L 63/1408; H04L 63/1416; H04L 63/1425; H04L 63/1441; H04L 63/1458; H04L 2463/00; H04L 2463/141; H04L 2463/142; H04L 2463/143
See application file for complete search history.

(56) References Cited

U.S. PATENT DOCUMENTS

| 7,672,336 | B2 | 3/2010 | Bharrat et al. |
| 2008/0086435 | A1* | 4/2008 | Chesla ............... H04L 63/1458 706/12 |
| 2008/0256622 | A1 | 10/2008 | Neystadt et al. |
| 2010/0082513 | A1* | 4/2010 | Liu ..................... H04L 63/1458 706/46 |

(Continued)

FOREIGN PATENT DOCUMENTS

| JP | 2004507978 A | 3/2004 |
| JP | 2004248185 A | 9/2004 |

(Continued)

*Primary Examiner* — Shanto Abedin
*Assistant Examiner* — Adrian Stoica
(74) *Attorney, Agent, or Firm* — Arent Fox LLP; Michael Fainberg

(57) ABSTRACT

Disclosed are a system, a method, and computer readable storage medium having instructions for filtering network traffic to protect a server from a distributed denial-of-service (DDoS) attack. The described technique includes intercepting data from a network node to the computing device responsive to detecting a computing device is subject to a DDoS attack. The technique further includes determining one or more data transmission parameters based on the intercepted data, assigning a danger rating to the network node, and changing the danger rating of the network node based on application of a filter and on the data transmission parameters. The described technique limits a transmittal of data from the network node to the computing device if the resultant danger rating of the network node exceeds a threshold value.

21 Claims, 6 Drawing Sheets

(56) References Cited

U.S. PATENT DOCUMENTS

| | | | |
|---|---|---|---|
| 2012/0079592 A1 | 3/2012 | Pandrangi | |
| 2014/0380457 A1 | 12/2014 | Cassell et al. | |
| 2015/0026800 A1* | 1/2015 | Jain | H04L 63/1458 726/22 |
| 2016/0352765 A1* | 12/2016 | Mermoud | H04L 63/1425 |
| 2017/0279836 A1* | 9/2017 | Vasseur | H04L 63/1425 |
| 2017/0279838 A1* | 9/2017 | Dasgupta | H04L 63/1425 |
| 2017/0279847 A1* | 9/2017 | Dasgupta | H04L 63/1458 |

FOREIGN PATENT DOCUMENTS

| | | |
|---|---|---|
| JP | 2004-078602 A | 11/2004 |
| JP | 2007259223 A | 10/2007 |

* cited by examiner

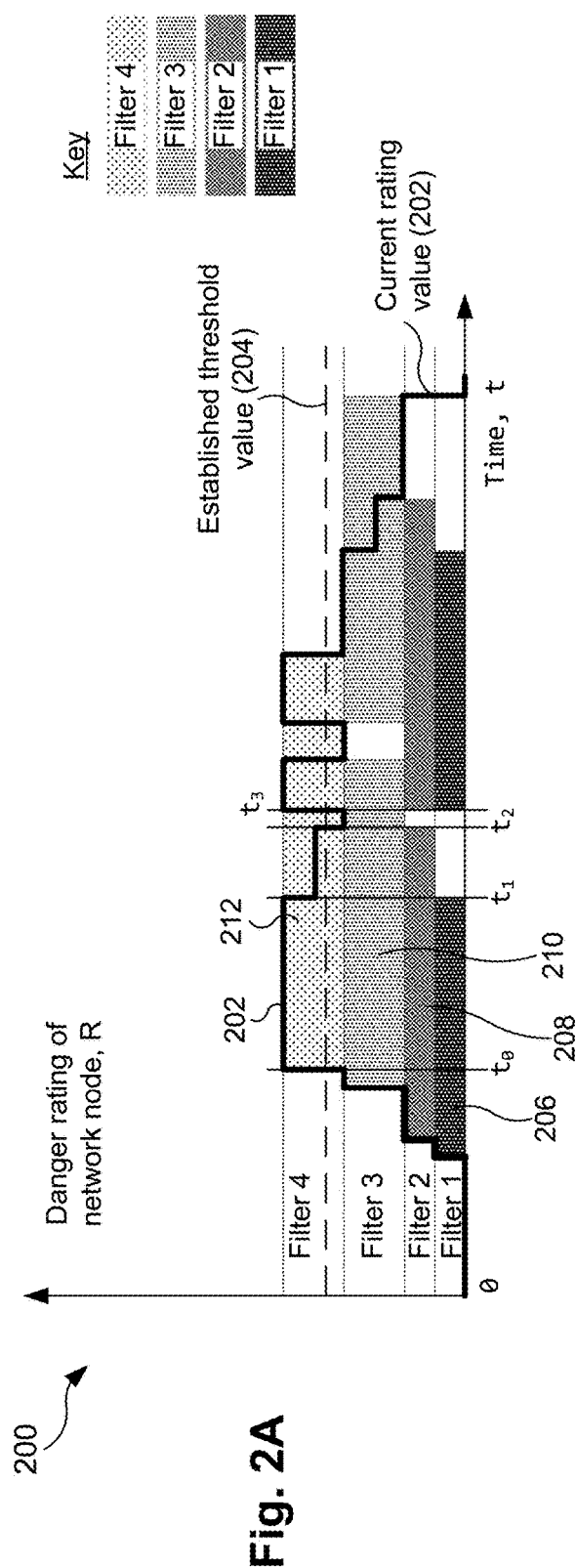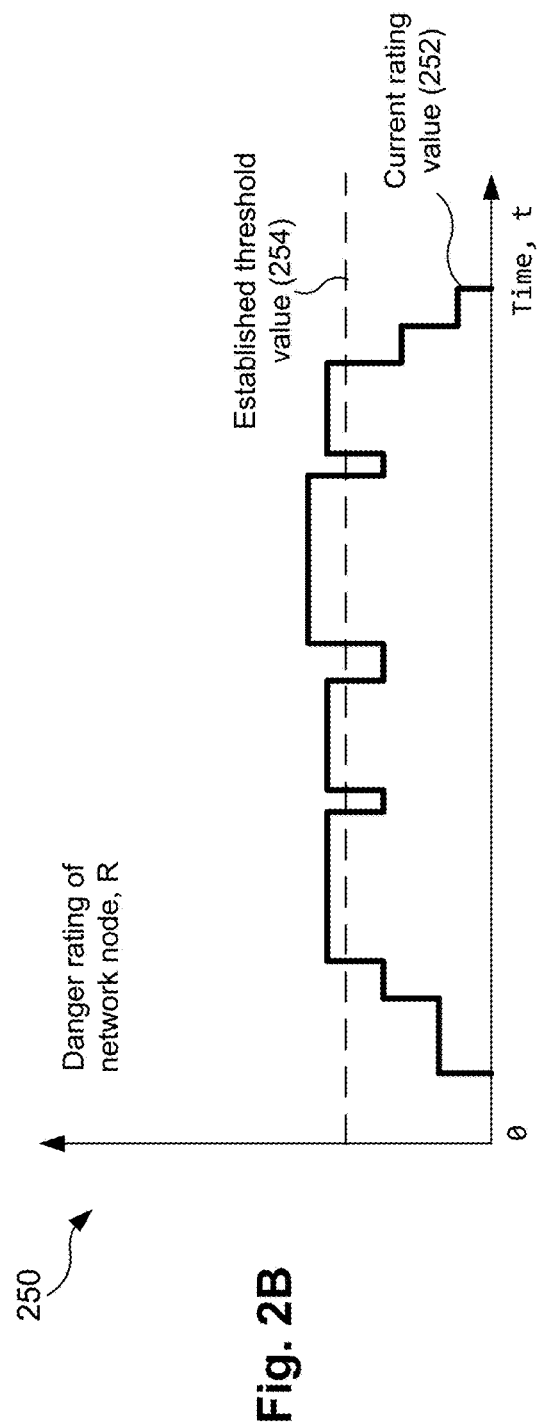
Fig. 2A
Fig. 2B

SYSTEM AND METHOD OF TRAFFIC FILTERING UPON DETECTION OF A DDOS ATTACK

CROSS-REFERENCE TO RELATED APPLICATIONS

This application claims benefit of priority under 35 U.S.C. 119(a)-(d) to a Russian Patent Application No. RU 2017115047 filed on Apr. 28, 2017, which is incorporated by reference herein.

FIELD OF TECHNOLOGY

The present disclosure relates to the field of cybersecurity, and specifically, to systems and methods of traffic filtering upon detection of DDoS attacks.

BACKGROUND

The problem of protecting computer devices, especially those containing server software or any other software, whose uninterrupted and stable operation is highly important, is especially acute at present. Web hosting, banking servers, or any other servers to which access is gained by means of the Internet, are potential targets of distributed denial of service (DDoS) attacks. Such attacks are often carried out with the aid of botnets (a plurality of computer devices controlled remotely by a hacker) and result in significant delays, and sometimes to the total failure of the server processing requests from any other computer devices, such as Hypertext Transfer Protocol (HTTP) requests.

There are various approaches to protecting servers against DDoS attacks. In most instances, these approaches involve an analysis of the traffic arriving at the server in order to detect signs of a DDoS attack in the incoming traffic of the server, and also subsequent blocking of traffic which is characteristic of DDoS attacks.

Although the approaches known from the prior art are aimed at solving the stated problems in the field of protecting computer devices against DDoS attacks, they do not adequately solve the problem of traffic filtering.

SUMMARY

Thus, the present disclosure enables a more effective solution to the problem of traffic filtering during a DDoS attack.

Exemplary aspects of the present disclosure provide a method for filtering network traffic to protect a server from a DDoS attack. In one exemplary aspect, the method includes responsive to detecting a computing device is subject to a DDoS attack, intercepting data from a network node to the computing device. The method further includes determining one or more data transmission parameters based on the intercepted data, assigning a danger rating to the network node, and changing the danger rating of the network node based on application of a filter and on the data transmission parameters. The method further includes, responsive to determining that the danger rating of the network node exceeds a threshold value, limiting a transmittal of data from the network node to the computing device.

In another exemplary aspect, assigning the initial danger rating to the network node further includes assigning the danger rating to the network node according to a database storing danger ratings of known network nodes and on a network address of the network node.

In another exemplary aspect, the method includes updating a stored danger dating in the database based on a period of time in which the transmittal of data from the network node to the computing device was limited.

In another exemplary aspect, the method includes reverting changes to the danger rating of the network node responsive to an expiration of the filter, and, responsive to determining that the danger rating of the network node no longer exceeds the threshold value, canceling the limiting of the transmittal of data from the network node to the computing device.

In another exemplary aspect, the method includes extending a lifetime of the filter responsive to detecting a repeat triggering of the filter based on the data transmission parameters.

In another exemplary aspect, wherein changing the danger rating of the network node based on application of a filter and on the data transmission parameters further includes increasing the danger rating of the network node based on a determination that criteria associated with the filter is met by the data transmission parameters.

In another exemplary aspect, wherein limiting the transmittal of data from the network node to the computing device further includes limiting a channel capacity between the network node and the computing device based on a degree to which the danger rating of the network node exceeds the threshold value.

According to another exemplary aspect of the present disclosure, a system is provided for filtering network traffic to protect a server from a DDoS attack. The system includes a memory device storing one or more filters, and a processor. The processor is configured to, responsive to detecting a computing device is subject to a DDoS attack, intercept data from a network node to the computing device. The processor is further configured to determine one or more data transmission parameters based on the intercepted data, assign a danger rating to the network node, and change the danger rating of the network node based on application of a filter and on the data transmission parameters. The processor is further configured to, responsive to determining that the danger rating of the network node exceeds a threshold value, limit a transmittal of data from the network node to the computing device.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2A illustrates a graph depicting changes to a danger rating of a network node over time upon use of several filters.

FIG. 2B illustrates a graph depicting changes to a the danger rating of a network node when this network node is involved in a DDoS attack according to an exemplary aspect.

DETAILED DESCRIPTION

Figure 1:
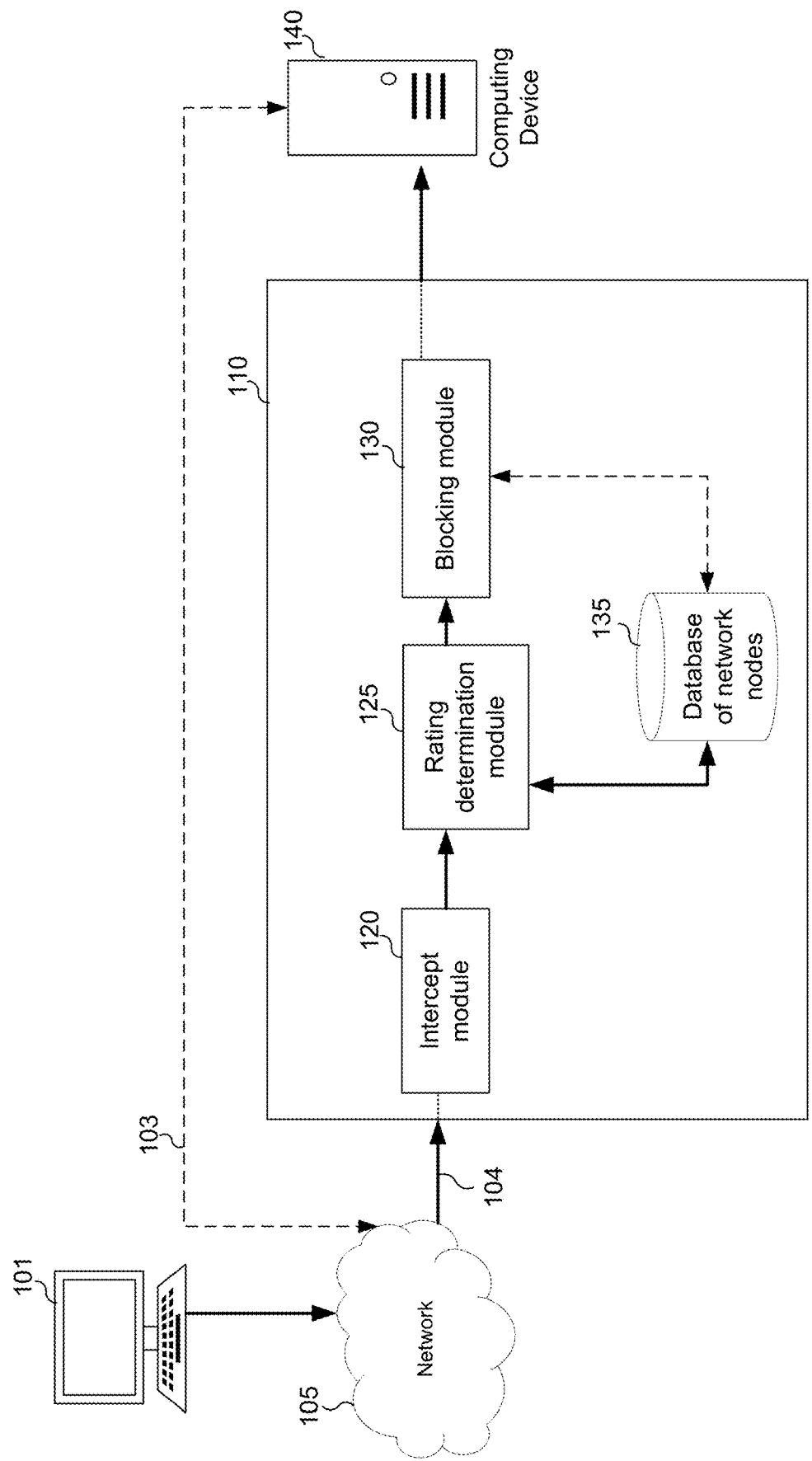
FIG. 1 illustrates a block diagram of a system for traffic filtering upon detection of a DDoS attack according to an exemplary aspect.

Example aspects are described herein in the context of a system, method and computer program product for filtering network traffic upon detection of a DDoS cyber-attack. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The system of traffic filtering upon detection of a DDoS attack in the present disclosure may be realized by real-world devices, systems, components and groups of components realized with the use of hardware such as integrated microcircuits (application-specific integrated circuits, ASICs) or field-programmable gate arrays (FPGA) or, for example, in the form of a combination of software and hardware such as a microprocessor system and set of program instructions, and also neurosynaptic chips. The functionality of such system means may be realized solely by hardware, and also in the form of a combination, where some of the functionality of the system means is realized by software, and some by hardware. In certain variant embodiments, some or all of the means may be executed on the processor of a general-purpose computer (such as the one shown in FIG. 4). The system components may be realized either within a single computing device or spread out among several interconnected computing devices.

A network node is used herein to describe an electronic device (including a computing device) which is connected to a data transmission network (such as the Internet) and is able to send data by means of that network. Examples of a network node might be: personal computing devices, mobile computing devices, servers, network routers and switches, or any other devices able to send data by means of the data transmission network (such as IP cameras, television sets, refrigerators, IoT (Internet of Things) devices, and so on).

A parameter of the data being sent is used herein to describe information characteristic of the data being sent by the network node, including information characteristic of the network node itself which is involved in the data transmission. Parameters of data being sent might be data from the headers of the packets of data transmitted (on any of the layers of the stack model TCP/IP or OSI/ISO), and also the frequency characteristics of the packets (for example, the number of TCP packets transmitted in one second), including packets with identical content. Examples of the parameters of data transmitted are at least: the IP address of the network node, the network port of the network node being used for the data transmission, the mac-address of the network node, the set of HTTP packets of the data being transmitted (for example, per unit of time), the set of TCP packets of the data being transmitted, the set of IP packets of the data being transmitted, the set of packets of any other data transmission protocol, the number of connections established between the network node and the computing device, the number of POST requests being transmitted per second, the number of TCP connections established, and also derivatives of the aforementioned parameters.

A danger rating of a network node is used herein to describe the likelihood that data sent from the network node to a computing device is being used to carry out a DDoS attack. In some exemplary aspects, the danger rating may be represented as a quantity or numeric value, for example, the higher the number the higher the likelihood. The danger rating of a network node can be changed by applying at least one filter to the parameters of the data being sent. A filter is a software component which can be realized in the form of a rule which, along with a number of criteria, corresponds to a set of actions, such as changing the danger rating of the network node, which are carried out if the parameters of the data being sent meet the criteria of the filter. Every change of the danger rating of a network node with the help of the filter has its own lifetime, upon expiration of which that change is canceled.

FIG. 1 illustrates a block diagram of a system 110 for traffic filtering upon detection of a DDoS attack according to an exemplary aspect, as well as the entities related to it: a network node 101, a computing device 140 which is under a DDoS attack, and also the data transmission network 105 by means of which the network node 101 will send data to the computing device 140. The traffic filtering system 110 includes an intercept module 120, a rating determination module 125 communicatively connected to the intercept module 120, a database 135 of network nodes communicatively connected to the rating determination module 125, and a blocking module 130 communicatively connected to the rating determination module 125. While the present disclosure describes a system for traffic filtering upon detection of a DDoS attack specifically, it is understood that aspects of the present disclosure may be extended to general denial of service (DoS) attacks, or even other forms of cyber-attacks.

The computing device 140 is a computing device which is under a DDoS attack (i.e., attacked by a plurality network nodes carrying out a DDoS attack). The system 110 may be configured to detect that the computing device 140 is under a DDoS attack using a variety of known techniques of detecting denial of service attacks including based on analysis of the data being received by the computing device 140 via the data transmission network 105. The computing device 140 in the general case may be any given computing device connected to the data transmission network 105. In one exemplary aspect, the computing device 140 is a server, or processor providing services to another processor, such as a web server, an email server or a file transfer (ftp) server.

In yet another exemplary aspect, the computing device 140 is a personal computing device (including a mobile computing device).

For simplicity of explanation, the network node 101 may be a personal computing device—e.g., a personal computer (which, however, in the context of the stated generalization, has all the properties and data in the definition of the term network node).

The network node 101 may be communicatively connected to the computing device 140 (i.e., exchanges data with the computing device 140) via a data transmission network 105, and also components of the traffic filtering system 110. In the general case, the network node 101 may be communicatively connected to the computing device 140 directly (as represented by 103) via the network 105 (which, for example, may comprise a large number of data transmission devices). However, under conditions of a DDoS attack on the computing device 140 the data being transmitted to the device 140 is redirected (as represented by 104) to a filtering device, namely, to the traffic filtering system 110 using any one of the known approaches for redirecting network traffic, such as replacing routing tables. Thus, all the data being transmitted by the network node 101 to the computing device 140 first ends up in the traffic filtering system 110. In some aspects, the data sent from the computing device 140 to the network node 101 also first ends up in the system 110.

In the general case, a group of network nodes 101 may transmit data at the same time to the computing device 140 (and, accordingly, wait and receive replies from the device 140). But if it is detected that the computing device 140 is under a DDoS attack (as was noted above, with the help of any suitable method), certain network nodes transmitting data to the device 140 may be participating in this attack, and others may not be participating. In such a case, the task of the system 110 is to block (or at least limit) the transmission of the data being used for the attack. The present disclosure considers the exchange of data between a network node 101 and the computing device 140 for the purpose of subsequent analysis of the data being transmitted and subsequent protection of the device 140 against the transmission of the data being used for the DDoS attack, namely, by limiting the transmission of the data by the network node 101 to the computing device 140. It should be noted that by data transmission here and below is meant not only the transmission of certain information, such as that in http requests, but also any transmission of data, including a transmission of data in order to establish connections, and also to carry out DDoS attacks (since ordinary requests, sent in a large quantity, are often used to carry out a DDoS attack). In order to carry out a DDoS attack on the part of a network node 101, the data transmission may assume for example the following forms: HTTP flood (i.e., the transmission of a large quantity of data during a relatively short interval of time); ICMP (Internet Control Message Protocol) flood; UDP (User Datagram Protocol) flood; and SYN (i.e., a synchronize message of a TCP exchange) flood, and so forth.

In one exemplary aspect, the intercept module 120 may be configured to intercept the data arriving (i.e., being transmitted) from the network node 101 at the computing device 140. In order to carry out the interception, in one exemplary aspect, the intercept module 120 may be realized in the form of a router or proxy server, so that the module 120 obtains access to all data being sent from the network node 101 to the computing device 140. After this, the intercept module 120 determines the parameters of the data being sent. In one example aspect (besides the examples of data parameters already indicated above), the intercept module 120 may determine the following parameters of the data being transmitted:

the IP address of the network node 101;
the number of SYN packets being transmitted per second;
the number of TCP connections being established per second;
the number of TCP connections established;
the number of bytes being transmitted per second:
the number of packets being transmitted per second;
the number of GET requests being transmitted per second;
the number of POST requests being transmitted per second;
the number of HEAD requests being transmitted per second;
the number of protected connections being established (by means of TLS/SSL) per second;
the total number of other http requests being transmitted per second (all except GET, POST and HEAD);
the URL being accessed by the network node 101;
the number of requests being sent to the aforementioned URL per second;
the total number of requests being sent to the computing device 140;
the ratio of the number of unique values of the User-Agent header request to the total number of requests being sent to the computing device 140.

Each parameter of the data being transmitted is characterized by the data transmission protocol within which it is determined (for example, for the number of SYN packets being transmitted per second, the protocol within which it is determined is TCP). The parameters of the data being transmitted that are determined during the interception of the data transmission are sent by the intercept module 120 to the rating determination module 125. It should be noted that the parameters of the data being transmitted may be determined on the basis of the data being sent within a certain interval of time: for the number of packets being sent per second, for example, one may calculate the total quantity of packets in 10, 20 or 30 seconds, and this quantity of packets will be divided by the number of seconds during which the aforementioned number of packets was determined. In some exemplary aspect, instead of parameters related to the value of a certain quantity in a given interval of time (such as the number of packets being sent per second), the intercept module 120 may determine several parameters of the data being sent: the number of packets being sent per second, counted over 10 seconds; the number of packets in 10 seconds, divided by 10; the number of packets sent per second, counted over 20 seconds; and the number of packets sent per second, counted over 30 seconds, accordingly. In such a case, each of the enumerated parameters of data transmitted is a separate, independent parameter. In yet another exemplary aspect, the intercept module 120 may calculate the parameters of the data transmission related to the number of certain events (such as the transmission of requests, the transmission of bytes, the establishment of TCP connections) per unit of time (in other words, the rate) such as the number of packets being sent per second or GET requests per second, is done on the basis of the Token Bucket algorithm: a buffer of given size is determined ("bucket size", calculated by the number of aforementioned events— transmission of packets, requests, GET requests, and so on), the rate is determined as the ratio of the bucket size to the time for filling this bucket. The time for filling of the bucket is the time during which a number of events equal to the size of the bucket occurs.

The rating determination module 125 may be configured to determine the danger rating of a network node 101. In order to carry out the determination of the danger rating of a network node, the rating determination module 125 carries out at least two steps: assignment of the danger rating of the network node by means of a database 135 of network nodes, and also changing the danger rating of the network node on the basis of the parameters of the data being sent, as transmitted by the intercept module 120.

In order to assign the danger rating of the network node to the corresponding network node 101 sending data to the computing device 140, the determination module 125 makes a request to the database 135 of network nodes, the request containing at least the IP address of the network node 101. In response to the request, the database 135 of network nodes returns to the rating determination module 125 the danger rating of the network node corresponding to the IP address of the network node 101, such as 10 or 46. In the event that the database 135 of network nodes does not contain a danger rating of the network node corresponding to the IP address of the network node 101, the rating determination module 125 can assign a "default value" to the network node 101 for the danger rating of the network node, such as 0. It should be noted that for network nodes 101 which have a low probability of being involved in the sending of data to the computing device 140 as part of a DDoS attack—trusted network nodes 101—the database 135 of network nodes may store danger rating values of the network node such that this rating knowingly cannot exceed an established threshold value upon later change. The values of the network node ratings for such "trusted" network nodes 101 are set lower than the aforementioned "default value", such as −1000 or −100,000. Trusted network nodes 101 might be, for example, network nodes 101 whose IP addresses match the IP addresses of known servers belonging to, administered by, or otherwise associated with trusted entities and organizations (e.g., Google®, Microsoft®, Yandex® and others), as well as those whose IP addresses correspond to a subnet, for example, starting with "192.168 . . . " In some exemplary aspects, the database 135 of network nodes may store not every enumerated IP address of a network node 101 of the subnet, but also one or more masks that represents multiple IP addresses (e.g., "192.*.*.*" or "128.*.*.*").

Besides the ratings of "trusted" network nodes 101, the database 135 of network nodes in the general case may be configured to store the danger ratings associated with any network nodes 101, each of which is characterized by an IP address (or mask). In the general case, the information stored in the database 135 of network nodes is placed therein by an expert in the field of computer security or any other qualified person. In one exemplary aspect, the information regarding the danger rating of the network nodes is kept not within the system 110, but outside the system, for example on a remote server. In this case, the rating determination module 125 assigns to the network node 101 a network node rating by making a request to this remote server.

Besides the assignment of the danger rating to the network node 101, the rating determination module 125 may be configured to change the danger rating associated with a network node 101 (as compared to the value that was obtained with the help of the database 135) either upward or downward (i.e., increase or decrease). In some exemplary aspects, the rating determination module 125 may use one or more filters to change the danger rating of a network node 101. As mentioned above, a filter is a software component of the system 110, which can be realized in the form of a rule matching up a series of criteria with a set of actions. The rating determination module 125 may change the danger rating of a network node 101 if the parameters of the data being sent meet the criteria of the filter (in other words, the actions are carried out if the corresponding filter is triggered). Each change in the danger rating of a network node 101 by means of a filter may have a corresponding lifetime or time duration, after the expiration of which the mentioned change is canceled or reverted (in other words, the rating value is changed back) For example, if the danger rating of the network node was increased by the value X as a result of the use of the filter, after expiration of the lifetime of this change the rating will be decreased by a similar value X.

In one exemplary aspect, the filter may also be characterized by a data transmission protocol: such as TCP, IP, HTTP or HTTPS, and also by the connection port, such as "port 80". The presence of these characteristics makes the filter applicable only to those parameters of the data being transmitted that are obtained from data transmitted by the network node 101 in a network connection at the indicated port with the use of the indicated protocol. For example, if the filter is characterized as "TCP—port 80", then the filter is applicable only to the parameters of data transmitted that were determined from the data transmitted by the network node 101 in the context of the TCP data transmission protocol using the 80 port. An example of the filters used might be:

Filter 1: increase the danger rating of the network node by 100 for 10 minutes (in other words, the lifetime of this change is 10 minutes) if the number of SYN packets being transmitted per second exceeds 100 (in accordance with the aforementioned definition of a rating increase—an action which is performed when the data meet the criteria of the filter, namely, if the quantity of SYN packets being transmitted per second has crossed an established value);

Filter 2: increase the danger rating of the network node by 50, if the number of TCP connections established per second exceeds 1000, the lifetime of the change is 30 minutes;

Filter 3: increase the danger rating of the network node by 30, if the number of POST requests being sent per second exceeds 10, the lifetime of the change is 10 minutes;

Filter 4: increase the danger rating of the network node by 20, if the number of requests being sent per second to the same (particular) URL exceeds 5, the lifetime of the change is 10 minutes;

Filter 5: increase the danger rating of the network node by 40, if the number of HTTP requests being sent per second exceeds 100, the lifetime of the change is 10 minutes;

Filter 6: increase the danger rating of the network node by 35, if the number of established TCP connections exceeds 50, the lifetime of the change is 10 minutes;

Filter 7: increase the danger rating of the network node by 35, if the number of protected connections being established per second exceeds 5, the lifetime of the change is 10 minutes.

The rating determination module 125 may be configured to send information on the value of the danger rating of the network node that was determined for the network node 101 to a blocking module 130. It should be noted that the rating determination module 125 can send information on the value of the rating not only in the process of using the filters, and, correspondingly, in the process of changing the values of the danger rating of the network node, but also upon cancellation of the corresponding changes at the expiration of their lifetime.

The blocking module 130 may be configured to limit the transmittal of data from the network node 101 to the computing device 140 based on the respective danger rating of the network node 101. In some exemplary aspects, the blocking module 130 may limit the transmittal of data responsive to determining that the value of the danger rating of the network node exceeds an established threshold value, such as 2000. In one exemplary aspect, limiting of the data transmittal is understood to mean a blocking of the data transmission between the network node 101 and the computing device 140 (by any method known in the art). In another exemplary aspect, the limiting of data transmission is understood to mean a limiting of the channel capacity between the network node 101 and the computing device 140 (for example, from 1 Mb/s to 100 kb/s). The blocking module 130 may also be configured to limit the channel capacity based on the degree to which the danger rating of the network node exceeds a threshold value, e.g., the larger the difference between the danger rating and the threshold, the greater the limit placed on the channel capacity. For example, if the danger rating of a network node exceeds the established threshold value by 1000, the channel capacity is decreased by 50%—it becomes less than 2, and if the threshold value is exceeded by 2000, the channel capacity is decreased by 75% —it becomes less than 4.

In yet another exemplary aspect, the blocking module 130 determine how much to limit the channel capacity between the network node 101 and the computing device 140 based on a relationship between the historical and current values of the danger ratings and the threshold value, as shown in Equation (1) below:

$$P = 1 + \frac{R - R'}{|R' - R_0|};\quad(1)$$

where R is the ("current") value of the danger rating of the network node, R' is the established threshold value (determined as a result of changes), $R_0$ is the ("initial") value of the danger rating of the network node assigned to the network node 101, P is a quantity determining by how many times the channel capacity needs to be limited (i.e., decreased) between the network node 101 and the computing device 140.

The blocking module 130 may be configured to remove (i.e., cancel) any limitation on the data transmission between the network node 101 and the computing device 140. In one exemplary aspect, the blocking module 130 may remove the limitation on the data transmission between the network node 101 and the computing device 140 at the moment of expiration of the lifetime of that change in the danger rating of the network node (implemented by the use of the corresponding filter), after the cancellation of which the danger rating of the network node will cease to exceed the established threshold value.

In one exemplary aspect, the blocking module 130 does not monitor the value of the danger rating of the network node—it does not verify whether the danger rating is larger than the established threshold value or not, but only limits the data transmission between the network node 101 and the computing device 140 or cancels this limitation of the data transmittal. In this case, the blocking module 130 obtains from the rating determination module 125 only instructions to limit the data transmittal or to cancel this limitation. The rating determination module 125 will send an instruction to the blocking module 130 to limit the data transmittal if the danger rating of the network node, as determined by the rating determination module 125, exceeds the established threshold value. And the moment corresponding to the expiration of the lifetime of that change in the danger rating of the network node after the cancellation of which the danger rating of the network node will cease to exceed the established threshold value is also determined by the rating determination module 125.

For a complete understanding of the principles of using the filters, consider the example depicted in FIG. 2A. FIG. 2A illustrates a graph 200 depicting changes to a danger rating of a network node over time upon use of several filter. The graph 200 depicts the dependency of a danger rating of a network node over a period of time. The line 202 represents the value of the danger rating R, the "current" value at time t, the dashed line 204 represents the established threshold value for the danger rating of the network node R. Each regions (e.g., rectangles 206, 208, 210, 212) corresponding to one of the filters represents the magnitude of change in the danger rating of the network node—the height of the rectangle along the R axis—and the duration of that change (the lifetime of the change)—the length of the rectangle along the t axis. It is evident from the graph that the initial value of the danger rating of the network node is 0, which means that the rating assigned to the network node 101 with the aid of the rating determination module 125 (for example, as obtained from the database 135 of network nodes) has a value of 0. Then, on the basis of the parameters of the data being transmitted as determined by the intercept module 120, filters are applied by the rating determination module 125. At first, Filter 1 is used (as represented by region 206), which means that the parameters of the data being sent meet the criteria of Filter 1. After a certain time, as represented by regions 208 and 210, Filters 2 and 3 are applied ("triggered", in other words the criteria of the filters are met, and the actions prescribed by the corresponding Filters 2 and 3 are performed). Upon the triggering of Filter 4 (region 212) at time to the value of the danger rating of the network node begins to exceed the established threshold value. Upon exceeding the threshold value, the blocking module 130 carries out a limiting of the data transmittal between the network node 101 and the computing device 140. At time $t_1$ the lifetime of Filter 1 elapses, but the value of the danger rating of the network node (even allowing for the cancellation of the change in accordance with Filter 1) still exceeds the established threshold value, and the limiting of the data transmittal is not removed by the blocking module 130. At time $t_2$ the lifetime of Filter 2 expires, the value of the danger rating of the network node ceases to exceed the established threshold value, and the blocking module 130 at this time removes the aforementioned limitation of the data transmittal. At time $t_3$ Filters 2 and 3 are again triggered, which results in a repeated exceeding of the established threshold value by the danger rating of the network node, and so forth.

FIG. 2b illustrates a graph 250 depicting changes in the danger rating of a network node when this network node 101 is participating in a DDoS attack on the computing device 140 according to an exemplary aspect. The value of the rating of the network node (designated as the "current rating value 252") generally increases in steps as the filters applied by the rating determination module 125 change the value of the rating. After exceeding of the established threshold value 254 by the danger rating of the network node, the graph of this rating will "fluctuate" in the vicinity of the threshold value: after elapsing of the lifetime of the change in the danger rating of the network node, the cancellation of which lowers the value of the danger rating of the network node so much that it becomes less than the threshold value, the value of the rating decreases, but almost at once the next filter is triggered, whose application raises the value of the danger rating of the network node, and the line of the graph again becomes greater than the line of the established threshold value. These fluctuations then repeat until the network node 101 ceases to be involved in the DDoS attack (and, accordingly, to transmit such data to the computing device 140 whose transmission parameters are causing the triggering of certain filters), after which the value of the danger rating of the network node is decreased in steps to the original value (for example, the value determined with the aid of the database of network nodes or in some other way).

Figure 3A:
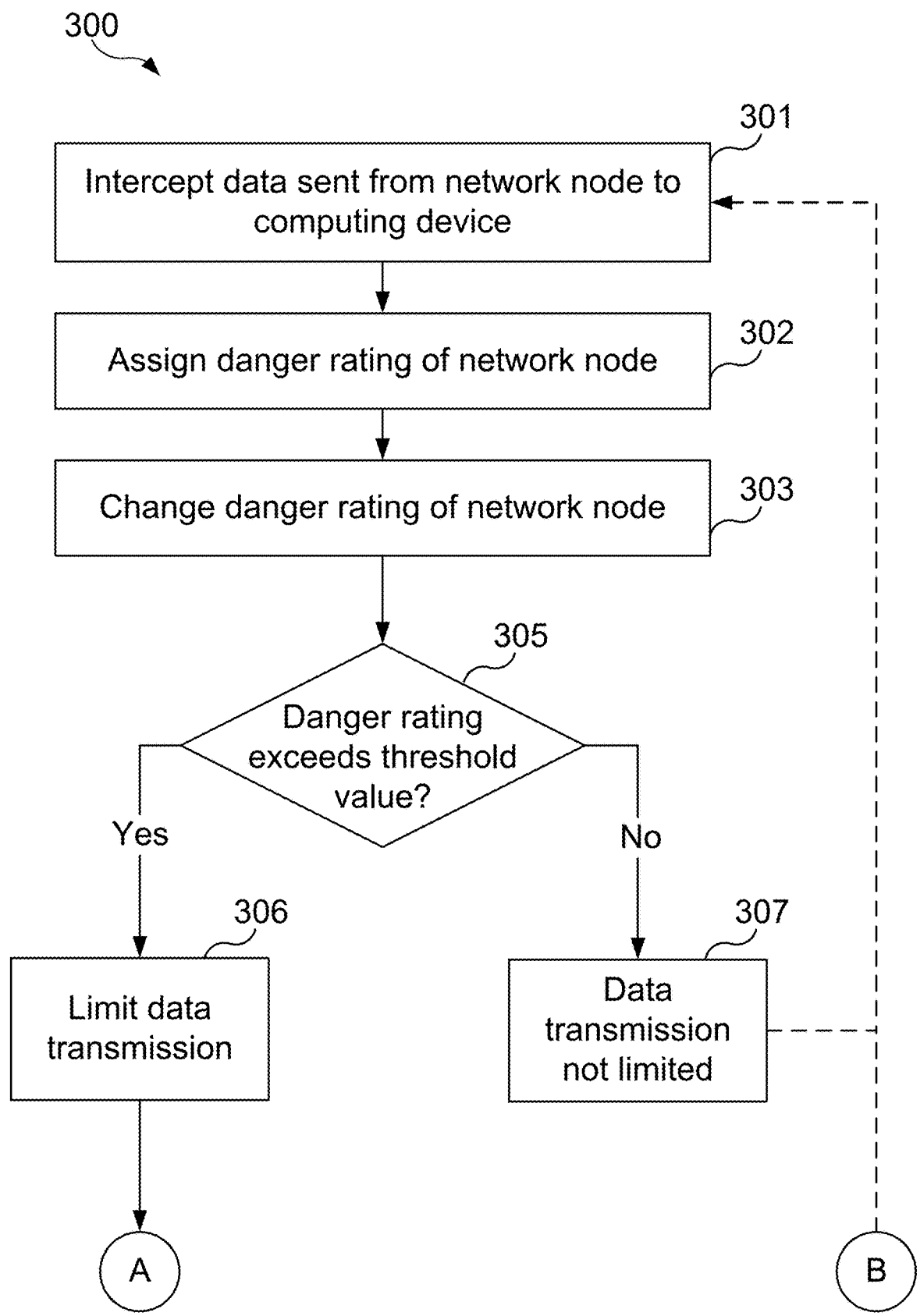
FIGS. 3A-3B illustrate a flowchart of a method of traffic filtering upon detection of a DDoS attack according to an exemplary aspect.
Figure 3B:
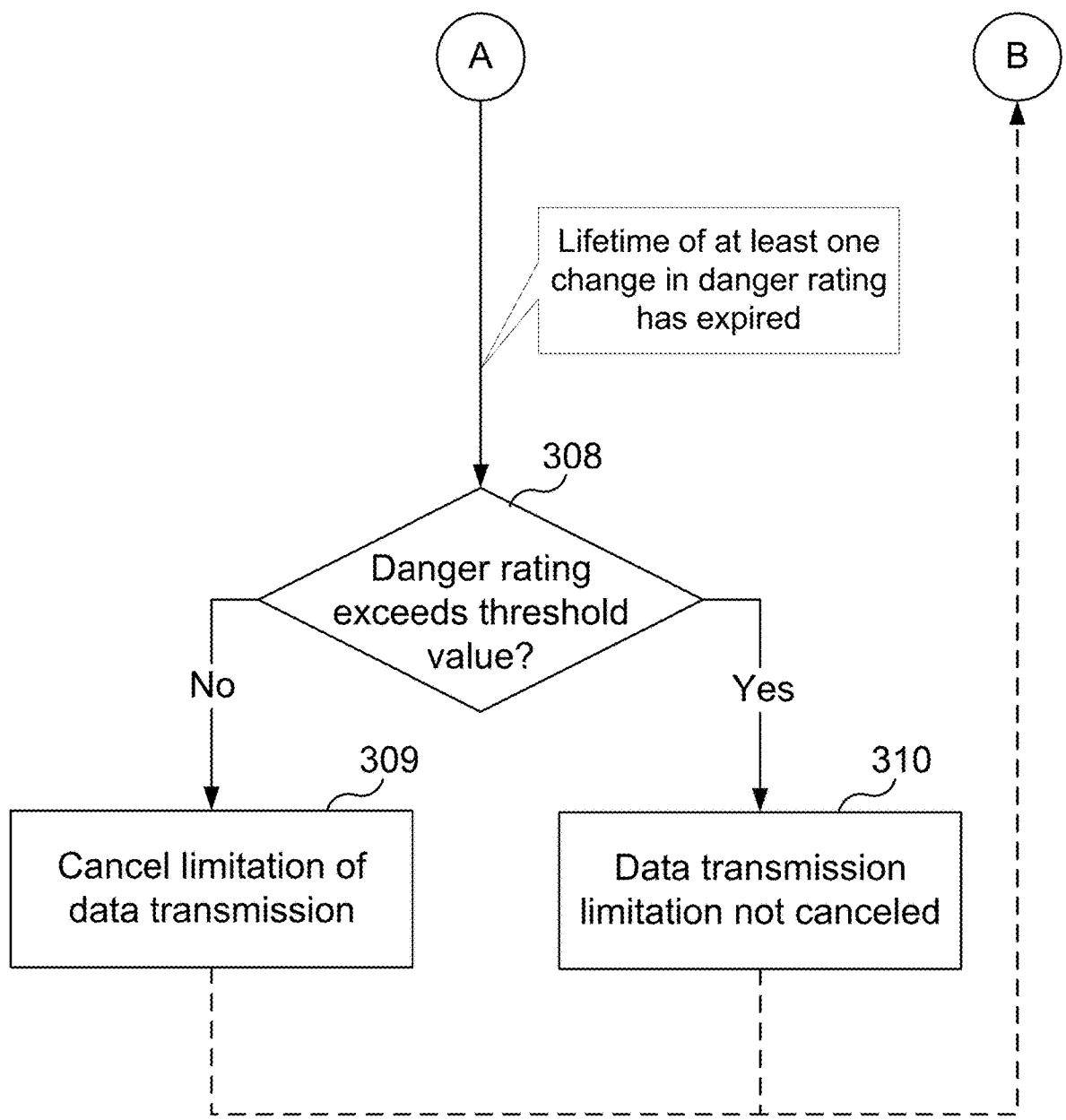

FIGS. 3A-3B illustrates a flowchart of a method 300 of traffic filtering upon detection of a DDoS attack according to an exemplary aspect. In step 301 the intercept module 120 intercepts the data (e.g., network traffic) being sent from the network node 101 to the computing device 140. Based on the results of the interception, the intercept module 120 determines the parameters of the data being sent. Using the data transmission parameters previously determined by the intercept module 120, at least the IP address of the network node 101, the rating determination module 125 in step 302 assigns to the network node 101 a danger rating of the network node. For the assigning of the danger rating to the network node, the rating determination module 125 makes a request to the database 135 of network nodes, containing the danger ratings of known network nodes, wherein the request contains at least one previously determined parameter of the data being sent from the network node—the IP address of the network node 101. After this, the rating determination module 125 in step 303 changes the danger rating of the network node 101 on the basis of the parameters of the data being transmitted, as previously determined, by applying at least one filter.

If, in step 305, the danger rating of the network node exceeds the established threshold value, then the blocking module 130 in step 306 limits the transmittal of data from the network node to the computing device 140. Otherwise, in step 307, the blocking module 130 does not limit said data transmittal. If, in step 306, the transmittal of data from the network node 101 to the computing device 140 has been limited, at the moment of the expiration of the lifetime of at least one change in the danger rating of the network node the blocking module 130 in step 308 again checks whether the rating exceeds the established threshold value. If the value of the rating has ceased to exceed the established threshold value, then in step 309 the blocking module 130 cancels the limitation of the data transmittal, or otherwise no cancellation of the limitations will occur. In one exemplary aspect, after performing steps 307, 308 and 310 the system 110 continues to carry out the steps of the method, starting with 301, omitting to perform step 302 once more. In one exemplary aspect, the repeating of the performance of the steps of the method is halted if the DDoS attack is over, about which the system 110 will receive notification from the remote server or an expert in computer security.

Figure 3C:
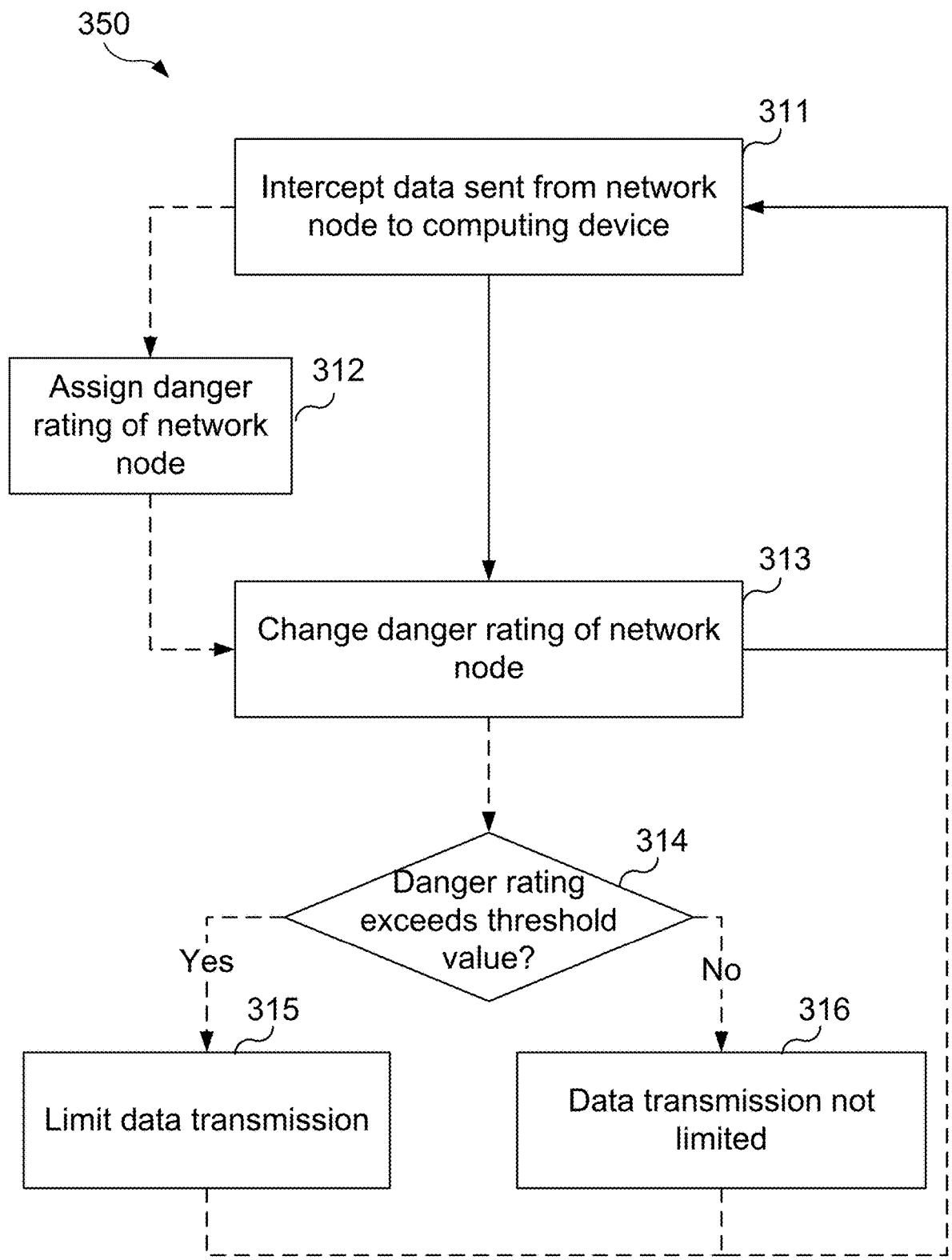
FIG. 3C illustrates a flowchart of a method of traffic filtering upon detection of a DDoS attack according to another exemplary aspect.

FIG. 3C illustrates a flowchart of a method 350 of traffic filtering upon detection of a DDoS attack according to an exemplary aspect. In step 311 the intercept module 120 intercepts the data being sent from the network node 101 to the computing device 140. Based on the results of the interception, the intercept module 120 determines the parameters of the data being sent. Using the data transmission parameters previously determined by the intercept module 120, at least the IP address of the network node 101, the rating determination module 125 in step 312 assigns to the network node 101 a danger rating of the network node. For the assigning of the danger rating to the network node, the rating determination module 125 makes a request to the database 135 of network nodes, containing the danger ratings of known network nodes, wherein the request contains at least one previously determined parameter of the data being sent from the network node—the IP address of the network node 101. After this, the rating determination module 125 in step 313 changes the danger rating of the network node on the basis of the parameters of the data being transmitted, as previously determined, by applying at least one filter. After this, steps 311 and 313 are repeated: namely, the intercept module 120 continues to intercept the data being transmitted by the network node 101 to the computing device 140, and the determination module 125 accordingly applies the available filters (at least one of them) to the parameters of the data being sent as determined by the intercept module 120. Thus, there is a continual application of the filters to the parameters of the data being sent and, accordingly, a change in the value of the danger rating of the network node if such changes are prescribed by the filters applied (upon being triggered).

In one exemplary aspect of the present disclosure, the same filter can be applied several times (e.g., with a specified interval of, say, 2 minutes), and if the criteria of the filters are again met by the newly determined parameters of the data being sent, the value of the danger rating of the network node also will be changed again (in such cases, the lifetime of each such change is counted off from the moment of each separate triggering of a filter). For example, if the criterion of the filter is that the number of TCP packets sent per second, counting for 10 seconds, is greater than 1000, and the intercept module 120 has determined the parameter of the data transmitted, the number of TCP packets transmitted per second, counting for 10 seconds, to be equal to 1204, then if the filter has prescribed increasing the danger rating of the network node by 450 if the criteria of the filter are met, the rating determination module 125 will increase the danger rating of the network node by 450. If after 3 minutes the intercept module 120 again determines the parameter of data transmitted, the number of TCP packets sent per second, counting for 10 seconds, to be equal to 1304 (which indicates an increase in the number of packets being sent), the danger rating of the network node will be additionally increased by the rating determination module 125 by another 450, while the decrease in the danger rating of the network node related to the cancellation of the changes upon expiration of the lifetime of those changes will be implemented not at the same time, but in two steps: first, by 450 (cancellation of the first rating change) and then by another 450 (cancellation of the second rating change with a 3 minute delay relative to the first).

In yet another exemplary aspect, the repeat triggering of the same filter results in the adding to the lifetime of the first change in the danger rating of the network node performed as a result of the applying of the filter, of an interval of time equal to the lifetime of the second change.

In one exemplary aspect, the lifetime of the second (repeat) change in the danger rating of a network node may match the lifetime of the first (previous) change, and in yet another exemplary aspect it may be different, for example greater, if the same filter is triggered again within a certain time, such as 5 minutes, from the preceding triggering, or be less if the same filter was not triggered again within a certain time, such as 30 minutes, from the preceding triggering.

In one exemplary aspect, the value of the second (repeat) change in the danger rating of the network node may match the value of the first (previous) change, and in yet another exemplary aspect it may be different, for example greater, if the same filter is triggered again within a certain time, such as 5 minutes, from the preceding triggering, or be less if the same filter was not triggered again within a certain time, such as 30 minutes, from the preceding triggering.

Upon occurrence of an event which may be characterized as being a change in the sign of the difference between the danger rating of the network node and the established threshold value (the case in which the rating was not lower than the threshold value, but then became lower, and the case when the rating was lower than the threshold value, but then did not become lower, i.e., it was higher or equal to it), the rating determination module 125 in step 314 will check whether the danger rating of the network node exceeds the established threshold value (we shall consider that the value of the difference is negative, minus sign "−" prior to the first change in the rating of the network node). If the threshold value is exceeded, then in step 315 the blocking module 130 will limit the transmitting of data by the network node 101 to the computing device 140. Otherwise, the transmittal of data is not limited in step 316 by the blocking module 130 (if a limitation already exists, it will be removed).

After performing one of the steps 315 or 316, the steps 311 and 313 are performed again (and, accordingly, jump to step 314 if a change in sign of the difference between the danger rating of the network node and the established threshold value occurs). In one exemplary aspect, the repeat performance of the steps of the method is halted if the DDoS attack is over, about which the system 110 will receive notification from the remote server or an expert in computer security.

It should be noted that in one exemplary aspect (applicable to both the methods 300, 350 represented in FIGS. 3a-3b, and in FIG. 3c), after the exceeding of the established threshold value by the danger rating of the network node, the application of filters is halted until such time as the danger rating of the network node becomes less than the established threshold value. Thus, the workload is reduced for the resources of the computing device (or several computing devices) that is used to implement the components of the system 110, since no data is intercepted at the time of exceeding of the threshold value and the application of filters is not an uninterrupted process of determining the parameters of the data transmitted and applying the filters to change the danger rating of the network node.

In one exemplary aspect, the steps of any of the methods 300, 350 are applied not only to one network node (in regard to the transmission of data by one network node 101 to a computing device), but to at least two network nodes 101, which makes it possible to provide protection for the computing device 140 against a DDoS attack being carried out with the involvement of multiple network nodes 101.

In one exemplary aspect, the rating determination module 125 is able to refresh the rating value of the network node (and, if such a value is lacking, to add it to the database 135) which is kept in the database 135 of network nodes and the corresponding IP address of the network node 101. The rating determination module 125 increases the value of the danger rating of the network node for the network node 101 relative to the value being kept for the network node 101 (and specifically for the IP address of the network node 101) in the database 135 of network nodes if, upon detecting a DDoS attack on the computing device 140, the transmission of data by the network node 101 to the computing device 140 was limited for a certain period of time. The longer the time in which the data transmission was limited, the more the rating value of the network node will be increased. The increase in the rating in such a situation may be calculated by the following formula shown in Equation (2):

$$\Delta = (R - R_0) * \left(1 + \frac{t}{T}\right), \tag{2}$$

where $\Delta$ is the change in rating, R is the maximum value of the danger rating of the network node during a DDoS attack, $R_0$ is the established threshold value, t is the time during which the transmission of data by the network node 101 to the computing device 140 was limited, and T is the duration of the DDoS attack. Equation (2) can also be used to decrease the value of the danger rating of a network node 101 relative to the value which is saved for the network node 101 in the database 135 of network nodes, if during a detected DDoS attack on the computing device 140 the transmission of data by the network node 101 to the computing device 140 was not limited (the difference $R-R_0$ will be negative and, accordingly, the value of $\Delta$ will also be negative). In order to change the danger rating of the network node that will be kept in the database 135, a different formula can be used whereby the lower the average value of the danger rating of the network node during the DDoS attack, the more the rating value of the network node will be reduced for the network node 101 relative to the value kept for the network node 101 (namely for the IP address of the network node 101) in the database 135 of network nodes. It should be noted that the formula given is only an example reflecting the above-described laws for changing the danger rating of a network node.

Thanks to the change in values of the danger ratings of the network nodes in the database 135 of network nodes, the network nodes previously involved in DDoS attacks will be more quickly disconnected from the computing device 140 during the next DDoS attack: the transmittal of data by these network nodes 101 to the computing device 140 will be limited more quickly, reducing the workload on the computing device 140 during a DDoS attack.

It should be noted that the database 135 of network nodes may also contain the value of the lifetime of the change in the danger rating of the network node which is produced by the applying of a certain filter (for example, Filter 1) to the parameters of the data being sent by the network node 101 to the computing device 140, which will be used to determine the time for cancellation of the rating changes produced by the application of that filter (for example, Filter 1). Thus, the lifetime of the rating changes may be different for different network nodes 101, if the database 135 of network nodes saves different values of the lifetime of the changes for these network nodes 101 (i.e., the database 135 of network nodes may save, for the IP address of a certain network node 101, lifetimes for rating changes of the network node produced by the application of each of the available filters).

In one exemplary aspect, the database 135 of network nodes will save for the network node 101 (accordingly, identified by an IP address), a correction factor K, which can be used by the rating determination module 125 to change the lifetime of changes in the danger rating of a network node for the network node 101 (the coefficient may have a default value, such as 1). In a particular aspect, the lifetime of each change in the rating of a network node for the network node 101 will be multiplied by K by the rating determination module 125 to determine the time of ending of the lifetime of each change in the danger rating of the network node carried out by the rating determination means 125 with the help of the filters used by it. The value of the coefficient K for the network node 101 can be changed by the rating determination module 125 on the basis of how long during the DDoS attack the transmission of data by the network node 101 to the computing device 140 was limited: the longer the data transmission was limited, the more the value of K will be increased, and the less the data transmission was limited, the less the value of K will be increased. The changed value of the coefficient K can be computed by the following formula shown in Equation (3):

$$K = K_0 * \left(1 + \frac{t}{T}\right), \quad (3)$$

where K is the new (changed) value of the coefficient, $K_0$ is the previous (old) value of the coefficient K, t is the time during which the data transmission by the network node 101 to the computing device 140 was limited, T is the duration of the DDoS attack. It should be noted that the given formula is only an example reflecting the above-described laws of changing the coefficient.

It should be noted that the determination of the time for the onset of a DDoS attack, the time for its ending, and the duration of the DDoS attack, lies beyond the bounds of the present invention, and the values used in the above formula may be provided to the rating determination module 125 either by an expert responsible for the security of the computing device 140, or by a means provided outside the bounds of the system 110, for example, on a remote server, and performing similar functions for detection of DDoS attacks.

In yet another exemplary aspect, the filters which are used by the rating determination module 125 may be interconnected, and the information on the relationship of the filters may be kept in the rating determination module 125 itself, but in another aspect this information on the relationship is kept in the database 135 of network nodes. The relationship between filters determines the time of expiration of the lifetime of changes in the danger rating of the network node caused by the application of the mentioned filters, so that for interconnected filters this time will occur at the same time, namely, at a later time among all the times of expiration of the lifetime of the changes. For example, say Filter 1 and Filter 2 are interconnected, the lifetime of the corresponding changes in the danger rating of the network node caused by the application of filters shall be designated as $T_1$ and $T_2$ respectively, Filter 1 was triggered at time $t_1$, and Filter 2 was triggered at time $t_2$. Given a relationship between the filters, the time of expiration of the lifetime of each change produced by the filters will be determined by the formula shown in Equation (4):

$$T = \max\{t_1+T_1; t_2+T_2\}. \quad (4)$$

It should be noted that the abovementioned approach, as well as the abovementioned formula, is valid only in the event that Filter 1 was triggered during the lifetime of the change produced by the use of Filter 2–$t_1 \in [t_2; t_2+T_2]$– or vice versa (Filter 2 was triggered during the lifetime of the change produced by the use of Filter 1–$t_2 \in [t_1; t_1+T_1]$). The above formula is also valid for several interconnected filters, in which case T is chosen as $\max\{t_1+T_1; t_2+T_2; \ldots; t_n+T_n\}$, where n is the number of interconnected filters triggered (i.e., those interconnected filters for which the time $t_i$ was determined).

Figure 4:
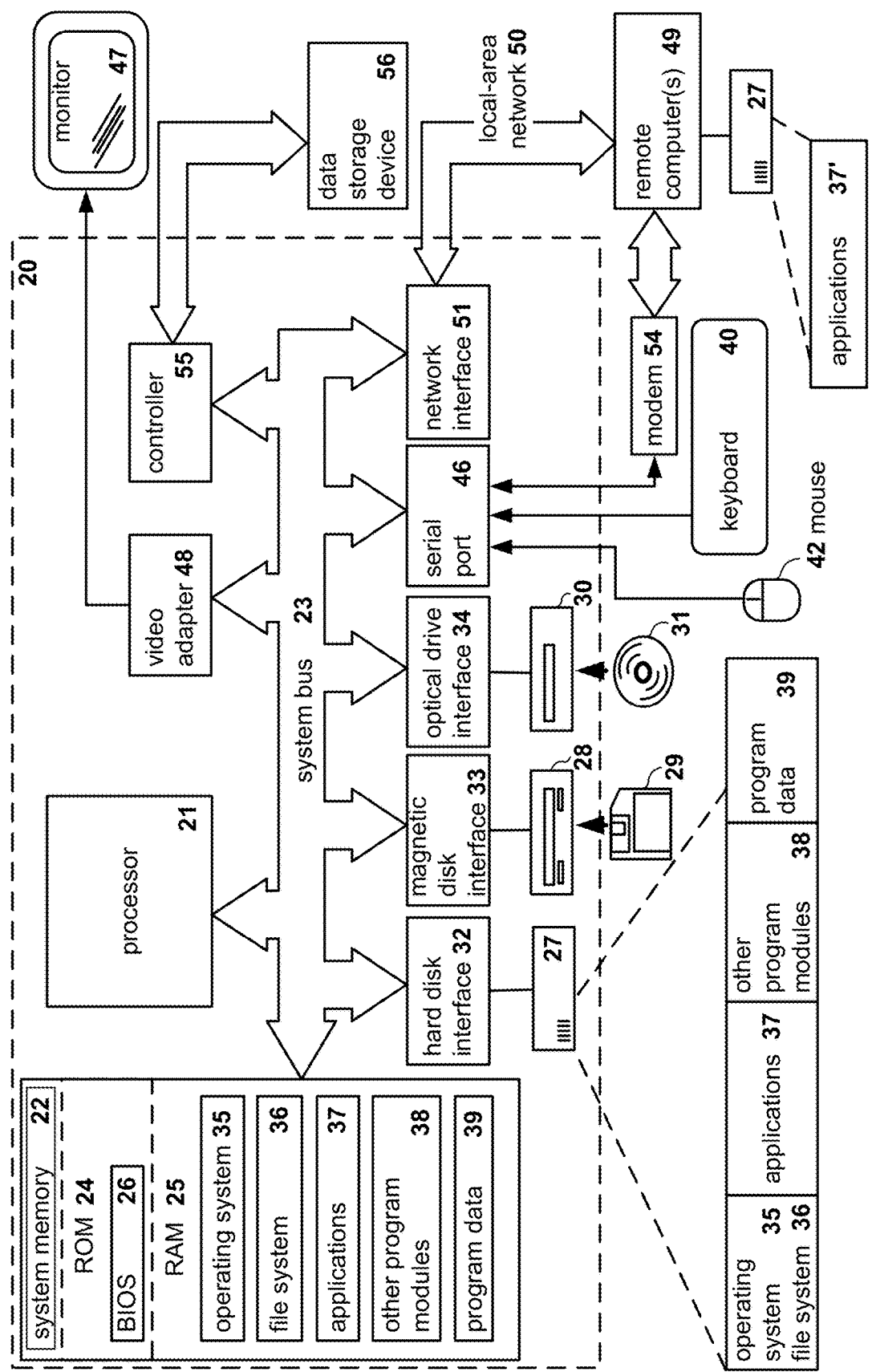
FIG. 4 illustrates a block diagram of a general-purpose computer system on which the disclosed system and method can be implemented according to an exemplary aspect.

FIG. 4 is a diagram illustrating a general-purpose computer system 20 on which aspects of systems and methods for filtering network traffic to protect a server from a distributed denial-of-service (DDoS) attack may be implemented in accordance with an exemplary aspect. It should be noted that the computer system 20 can correspond to the network node 101, system 110, and computing device 140, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for filtering network traffic to protect a computing device from a distributed denial-of-service (DDoS) attack, wherein the method comprises:
   responsive to detecting the computing device is subject to the DDoS attack, intercepting data from a network node to the computing device;
   determining one or more data transmission parameters based on the intercepted data;
   assigning an initial danger rating to the network node at least based on a network address of the network node comprising at least an IP address;
   changing the danger rating of the network node based on an application of a filter and on the data transmission parameters;
   responsive to determining that the danger rating of the network node exceeds a threshold value, limiting a transmittal of data from the network node to the computing device by limiting channel capacity between the network node and the computing device, wherein an amount by which the channel capacity is limited is determined based on a relationship between the changed danger rating and historical values of the danger rating; and
   halting the application of the filter until the danger rating of the network node becomes less than the threshold value.

2. The method of claim 1, wherein the assigning the initial danger rating to the network node further comprises:
   assigning the danger rating to the network node according to danger ratings of known network nodes stored in a database.

3. The method of claim 2, further comprising:
   updating a stored danger rating in the database based on a period of time in which the transmittal of data from the network node to the computing device was limited.

4. The method of claim 1, further comprising:
   reverting changes to the danger rating of the network node responsive to an expiration of the filter; and
   responsive to determining that the danger rating of the network node no longer exceeds the threshold value, canceling the limiting of the transmittal of data from the network node to the computing device.

5. The method of claim 1, further comprising:
extending a lifetime of the filter responsive to detecting a repeat triggering of the filter based on the data transmission parameters.

6. The method of claim 1, wherein changing the danger rating of the network node based on application of the filter and on the data transmission parameters further comprises:
increasing the danger rating of the network node based on a determination that criteria associated with the filter is met by the data transmission parameters.

7. The method of claim 1, wherein the limiting of the channel capacity between the network node and the computing device is further based on a degree to which the danger rating of the network node exceeds the threshold value.

8. A system for filtering network traffic to protect a computing device from a distributed denial-of-service (DDoS) attack, wherein the system comprises:
a memory device storing one or more filters; and
a processor configured to:
responsive to detecting the computing device is subject to the DDoS attack, intercept data from a network node to the computing device;
determine one or more data transmission parameters based on the intercepted data;
assign an initial danger rating to the network node at least based on a network address of the network node comprising at least an IP address;
change the danger rating of the network node based on an application of a filter and on the data transmission parameters;
responsive to determining that the danger rating of the network node exceeds a threshold value, limit a transmittal of data from the network node to the computing device by limiting channel capacity between the network node and the computing device, wherein an amount by which the channel capacity is limited is determined based on a relationship between the changed danger rating and historical values of the danger rating; and
halt the application of the filter until the danger rating of the network node becomes less than the threshold value.

9. The system of claim 8, wherein the processor configured to assign the initial danger rating to the network node is further configured to:
assign the danger rating to the network node according to danger ratings of known network nodes stored in a database.

10. The system of claim 9, wherein the processor is further configured to:
update a stored danger rating in the database based on a period of time in which the transmittal of data from the network node to the computing device was limited.

11. The system of claim 8, wherein the processor is further configured to:
revert changes to the danger rating of the network node responsive to an expiration of the filter; and
responsive to determining that the danger rating of the network node no longer exceeds the threshold value, cancel the limiting of the transmittal of data from the network node to the computing device.

12. The system of claim 8, wherein the processor is further configured to:
extend a lifetime of the filter responsive to detecting a repeat triggering of the filter based on the data transmission parameters.

13. The system of claim 8, wherein the processor configured to change the danger rating of the network node based on application of the filter and on the data transmission parameters is further configured to:
Increase the danger rating of the network node based on a determination that criteria associated with the filter is met by the data transmission parameters.

14. The system of claim 8, wherein the processor configured to limit the transmittal of data from the network node to the computing device is further configured to:
limit the channel capacity between the network node and the computing device further based on a degree to which the danger rating of the network node exceeds the threshold value.

15. A non-transitory computer readable medium comprising computer executable instructions for filtering network traffic to protect a computing device from a distributed denial-of-service (DDoS) attack, including instructions for:
responsive to detecting the computing device is subject to the DDoS attack, intercepting data from a network node to the computing device;
determining one or more data transmission parameters based on the intercepted data;
assigning an initial danger rating to the network node at least based on a network address of the network node comprising at least an IP address;
changing the danger rating of the network node based on an application of a filter and on the data transmission parameters;
responsive to determining that the danger rating of the network node exceeds a threshold value, limiting a transmittal of data from the network node to the computing device by limiting channel capacity between the network node and the computing device, wherein an amount by which the channel capacity is limited is determined based on a relationship between the changed danger rating and historical values of the danger rating; and
halting the application of the filter until the danger rating of the network node becomes less than the threshold value.

16. The non-transitory computer readable medium of claim 15, wherein the instructions for assigning the initial danger rating to the network node further comprises instructions for:
assigning the danger rating to the network node according to danger ratings of known network nodes stored in a database.

17. The non-transitory computer readable medium of claim 16, further comprising instructions for:
updating a stored danger rating in the database based on a period of time in which the transmittal of data from the network node to the computing device was limited.

18. The non-transitory computer readable medium of claim 15, further comprising instructions for:
reverting changes to the danger rating of the network node responsive to an expiration of the filter; and
responsive to determining that the danger rating of the network node no longer exceeds the threshold value, canceling the limiting of the transmittal of data from the network node to the computing device.

19. The non-transitory computer readable medium of claim 15, further comprising instructions for:
extending a lifetime of the filter responsive to detecting a repeat triggering of the filter based on the data transmission parameters.

20. The non-transitory computer readable medium of claim 15, wherein instructions for changing the danger rating of the network node based on application of the filter and on the data transmission parameters further comprises instructions for:
 increasing the danger rating of the network node based on a determination that criteria associated with the filter is met by the data transmission parameters.

21. The non-transitory computer readable medium of claim 15, wherein instructions for limiting the transmittal of data from the network node to the computing device further comprises instructions for:
 limiting the channel capacity between the network node and the computing device further based on a degree to which the danger rating of the network node exceeds the threshold value.

\* \* \* \* \*